Dec. 21, 1926.
C. R. McCROCKLIN ET AL
1,611,541
SANITARY EGG BREAKER AND SEPARATOR
Filed March 24, 1925
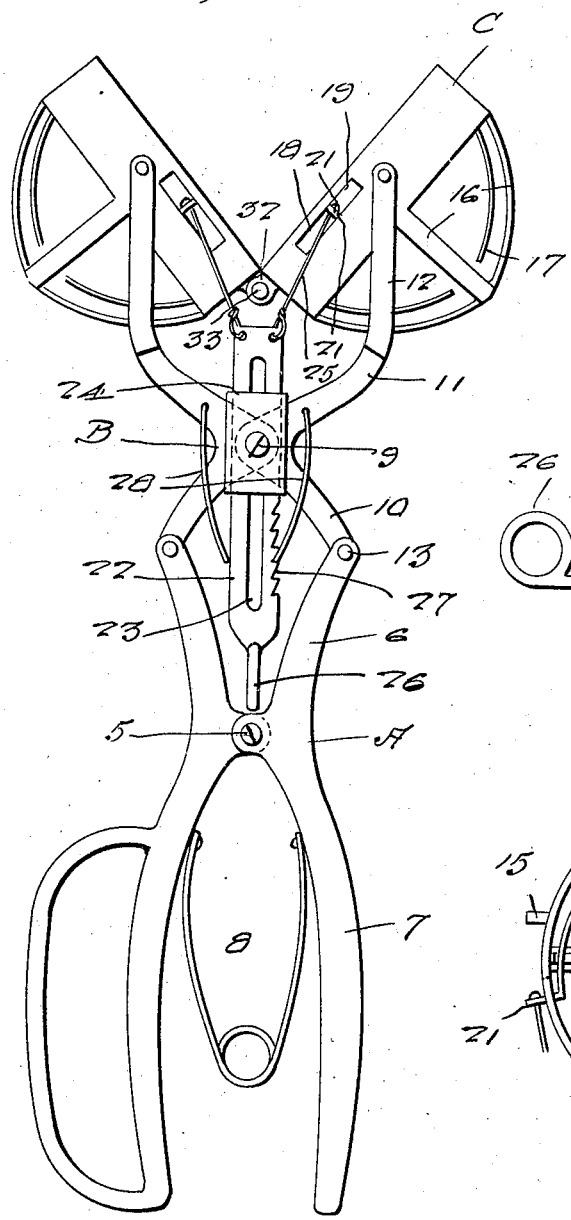
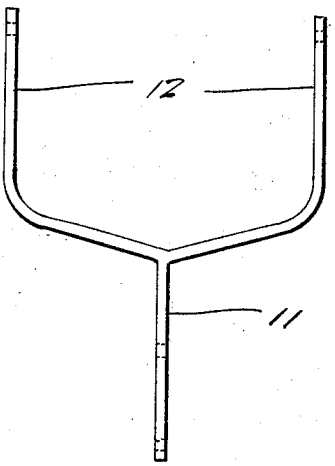
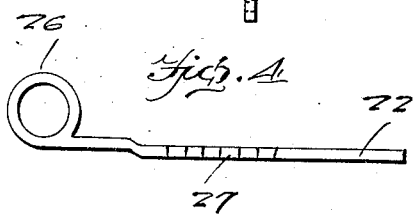
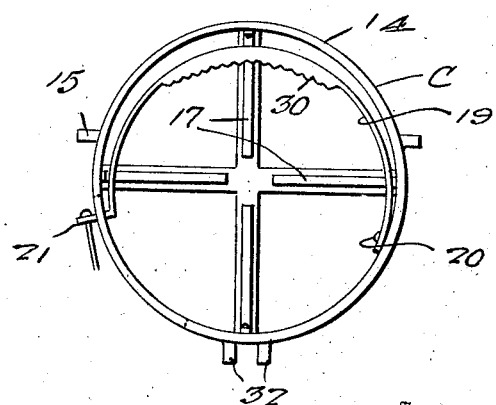
Inventors
C. R. McCrocklin
C. M. McMahon
By Clarence O'Brien
Attorney Patented Dec. 21, 1926.

1,611,541

UNITED STATES PATENT OFFICE.

CLAUD RAYMOND McCROCKLIN AND CHARLES MICHAEL McMAHON, OF MARSHALL, TEXAS.

SANITARY EGG BREAKER AND SEPARATOR.

Application filed March 24, 1925. Serial No. 17,935.

The present invention relates to an egg breaker and separator and has for its principal object to provide a device of this nature which is effective, efficient, and reliable in breaking an egg and separating the contents from the shell.

Another important object of the invention is to provide means for grasping an egg so that the same may be held as desired and while so held the shell may be broken and separated from the contents thereof.

A still further object of the invention is to provide a device of this nature which has an exceedingly simple structure, one which may be inexpensive to manufacture, and yet be strong, durable, sanitary, not liable to readily get out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of the improved device embodying the features of our invention, Figure 2 is a plan view of one of the cup shaped members, Figure 3 is a detail view showing one of the auxiliary jaws, Figure 4 is an edge elevation of the releasing slide bar, and Figure 5 is a detail perspective view of a guide plate.

Referring to the drawing in detail it will be seen that A designates a pair of main operating jaws pivoted together intermediate their ends by a bolt 5 or the like so as to provide short arms 6 and long arms or handles 7 having a spring 8 interposed therebetween for normally holding the short arms 6 toward each other. A pair of auxiliary jaws or levers B are pivoted together intermediate their ends by a bolt 9 so as to provide short arms 10 and relatively long arms 11. The long arms 11 are provided with spaced extensions 12. The short arms 10 are pivoted as at 13 to the short arms 6 in a substantially toggle formation so that the spring 8 normally holds the extensions 12 toward each other. A pair of cups C are pivotally engaged on the ends of the extensions 12. Each cup C includes a rim 14 having pintles 15 projecting therefrom and piercing the extremities of the extensions 12. A pair of bowed strips 16 project from the ring or rim 14 and cross each other thereby completing the cup. In each cup there is provided a plurality of spring fingers 17 which are attached to the rim 14 and extend along the bowed strips 16 in spaced relation thereto and terminate a distance from the bottom of the cup as is clearly seen in both Figures 1 and 2.

The rims 14 of the cups C are provided with slots 18. Bowed spring members 19 are mounted within the rims 14 having one end attached thereto as at 20 while the other ends are offset to form ears 21 projecting through the slots 18.

A bar 22 is provided with a longitudinally extending slot 23 for receiving the bolt 9 and a guide plate 24 tends to hold this slide bar in place on the bolt and alongside the pivoted portions of the levers B. Wires 25 are connected to one end of the bar 22 and to the ears 21 of the spring members 19. The other end of the bar 22 is provided with a finger loop 26. One longitudinal edge of the bar 22 is provided with ratchet teeth 27. Leaf springs 28 are attached to the arms 11 of the levers B and engage the longitudinal edges of the bar 22 and tend to hold this bar in alignment with the bolts 5 and 9. One of the springs engage the ratchet teeth 27.

The intermediate portions of the springs 19 are provided with cutting teeth 30. It will thus be seen that when the bar 22 is pulled downwardly in Figure 1, the springs 19 will be drawn toward the centers of the rims 14 of the cups C for severing the shell of an egg as will appear. One of the rims 14 is provided with a pair of ears 32 while the other rim is provided with a single ear 32 to be received therebetween in order that a pivot pin 33 may be passed therethrough, thus pivoting the two cups together.

This device is always held open, that is the cups are held swung away from each other by the spring 8. When the device is to be used for holding an egg which is to be fried, grasp the handles 7 in the hand. Place the egg so that the ends thereof will be disposed in the cups C as the handles 7 are moved toward each other and thus the egg is held securely over the frying pan. Place a finger in the loop 26 of slide bar 22 and pull the same downward toward the handles 7 until springs 19 with their sharp teeth 30 cut through the shell of the egg, then release the handles 7 slowly, and the egg will gently drop into the frying pan, or into any other receptacle that requires an unbroken fresh egg. One of the springs 28 will continue to hold the side bar 22 and thus the springs 19 will continue to hold the egg shell in the cups C until a slight pressure is made with the finger against the slide bar for releasing the springs 28 at which time the egg shells are free to drop into a refuse can or the like.

To use the device in handling soft or hard boiled eggs, proceed in the same manner as previously explained in handling an egg to be fried, or for any other use that a fresh egg is to be used, but with the exception that when the hard or soft boiled egg is taken out of the boiling water, it is cracked by squeezing the handles 7. If it be a soft boiled egg, the same should be held over the receptacle, letting whatever part of the egg that is loose to fall out, and whatever remains in the shell, cups C will continue to hold with the shell halves thereof until the contents thereof are removed with a spoon or other utensil. The shells may then be removed as previously indicated. In handling a hard boiled egg, after taking it from the boiling water, squeeze the handles 7 toward each other and then release the handles fully and remove the contents of both halves of the shells located in the cups with a spoon or other utensil, and proceed to drop the egg shell as previously indicated. This device will separate the whites from the yolks in a fresh egg by picking up the egg as previously explained, and squeezing the handles 7 so as to crack the egg and then by releasing the handles slightly which will open the cups from each other about one-quarter of an inch, and giving a twisting motion from right to left, the white will loosen from the yolk and flow out slowly, leaving the yolk in the shell which can then be slowly dropped in another receptacle, the shells being dropped in the usual manner, above explained.

It is thought that the construction, operation, and advantages of this invention will now be clearly understood without a more detailed description thereof. The present embodiment of the invention has been disclosed merely by way of example and attains all of the features of advantage as enumerated in the statement of the invention and the above description. It will be apparent that numerous changes in the details of construction, in the sizes, proportions, in the materials, and in the combination and arrangement of parts may be resorted to without departing from the scope or spirit of the invention as hereinafter claimed or sacrificing any of its advantages.

Having thus described the invention, what we claim as new is:—

1. A device of the class described including a pair of cup-shaped members pivoted together, means for swinging the cup-shaped members toward and away from each other, a bowed spring in each cup shaped member having one end fixed thereto, and means for flexing the bowed springs for breaking an egg shell all in the manner and for the purpose specified.

2. A device of the class described including a pair of cup-shaped members pivoted together, means for swinging the cup-shaped members toward and away from each other, a bowed spring in each cup shaped member having one end fixed thereto, means for flexing the bowed springs for breaking an egg shell all in the manner and for the purpose specified, the intermediate portions of said bowed springs provided with cutting teeth.

3. In a device of the class described, a pair of pivotally associated cup shaped members, means associated with the cup shaped members for swinging them toward and away from each other, said cup-shaped members provided with slots, bowed springs, one in each cup-shaped member having one end fixed thereto, the other ends of the bowed springs extending through the slots, the intermediate portions of said bowed springs provided with cutting teeth, wires attached to the ends of said springs extending through said slots, a slide bar attached to said wires, one edge of said slide bar provided with ratchet teeth, and a spring pawl engageable with said ratchet teeth all in the manner and for the purpose specified.

4. In a device of the class described, a pair of cup-shaped members pivoted together and provided with slots, springs of an arcuate formation mounted in the cup shaped members, one end of each spring fixed to its respective cup shaped member and having its other end extended through the slot thereof, a pair of levers pivoted together intermediate their ends, and at one end to the cup shaped members, a second pair of levers pivoted together intermediate their ends and at their ends to the other end of the first mentioned levers, a bar having an elongated slot for receiving the pivots of the first levers so as to be slidable thereof, and means connecting the end of the bar to the ends of the spring projecting through the slots.

5. In a device of the class described, a pair of cup-shaped members pivoted together and provided with slots, springs of an arcuate formation mounted in the cup shaped members, one end of each spring fixed to its respective cup shaped member and having its other end extended through the slot thereof, a pair of levers pivoted together intermediate their ends, and at one end to the cup shaped members, a second pair of levers pivoted together intermediate their ends and at their ends to the other end of the first mentioned levers, a bar having an elongated slot for receiving the pivots of the first levers so as to be slidable thereof, means connecting the end of the bar to the ends of the spring projecting through the slots, one edge of said bar being provided with ratchet teeth, and springs carried by the first levers and engageable with the side edges of the bar.

6. A device of the class described including a pair of egg holding members, means for moving the members toward and away from each other, a spring in each member, and means for flexing the springs for breaking an egg shell.

7. A device of the class described including an egg holder, a spring in the holder, and means for flexing the spring to break an egg shell disposed in the holder.

In testimony whereof we affix our signatures.

CLAUD RAYMOND McCROCKLIN.
CHARLES MICHAEL McMAHON.